(12) United States Patent
Delago

(10) Patent No.: US 10,959,491 B2
(45) Date of Patent: Mar. 30, 2021

(54) SHOELACE FASTENING FOR INNER SHOE

(71) Applicant: NITRO Snowboards Entwicklungs-GmbH, Oberammergau (DE)

(72) Inventor: Thomas Delago, Oberammergau (DE)

(73) Assignee: NITRO Snowboards Entwicklungs-GmbH, Oberammergau (DE)

(*) Notice: Subject to any disclaimer, the term of this patent is extended or adjusted under 35 U.S.C. 154(b) by 75 days.

(21) Appl. No.: 16/093,895

(22) PCT Filed: Apr. 6, 2017

(86) PCT No.: PCT/EP2017/058304
§ 371 (c)(1),
(2) Date: Oct. 15, 2018

(87) PCT Pub. No.: WO2017/178337
PCT Pub. Date: Oct. 19, 2017

(65) Prior Publication Data
US 2019/0104807 A1 Apr. 11, 2019

(30) Foreign Application Priority Data
Apr. 14, 2016 (DE) .......................... 102016106958.2

(51) Int. Cl.
*A43C 7/00* (2006.01)
*A43C 7/08* (2006.01)
(Continued)

(52) U.S. Cl.
CPC .............. *A43C 7/08* (2013.01); *A43B 5/0401* (2013.01); *A43B 5/16* (2013.01); *A43C 7/00* (2013.01); *F16G 11/106* (2013.01)

(58) Field of Classification Search
CPC .... A43C 7/08; A43C 7/00; A43B 5/16; A43B 5/0401; F16G 11/106
See application file for complete search history.

(56) References Cited

U.S. PATENT DOCUMENTS 3,574,900 A * 4/1971 Emery .................... B63B 21/08
24/130
3,845,575 A * 11/1974 Boden ...................... A43C 7/00
36/50.1

(Continued)

FOREIGN PATENT DOCUMENTS

DE 10238025 A1 8/2003
EP 1520490 A1 4/2005
(Continued)

OTHER PUBLICATIONS

International Search Report, PCT/EP2017/058304, dated Jul. 11, 2017, 3 pages.

(Continued)

*Primary Examiner* — Jason W San
(74) *Attorney, Agent, or Firm* — Stinson LLP

(57) ABSTRACT

A fastening element for a shoe of a boot comprising a disk-shaped single or multi-part main part, comprising a base side for fastening to the shoe, a cover side lying opposite the base side, and two grooves molded into a casing between the base side and the cover side for receiving and guiding a respective end of a shoelace. The grooves have an entrance angle at which shoelaces are to enter into the fastening element when laced in the pulling direction and an exit angle at which shoelaces are to exit the fastening element when pulled in the pulling direction, and wherein the entrance angle is greater than or equal to the exit angle.

5 Claims, 3 Drawing Sheets

(51) Int. Cl.
*A43B 5/04* (2006.01)
*F16G 11/10* (2006.01)
*A43B 5/16* (2006.01)

(56) References Cited

U.S. PATENT DOCUMENTS

| | | | | |
|---|---|---|---|---|
| 3,953,144 A | * | 4/1976 | Boden | F16G 11/101 403/374.2 |
| 4,102,019 A | * | 7/1978 | Boden | A43C 7/00 24/136 R |
| 4,379,358 A | * | 4/1983 | Wibrow | F16G 11/14 24/115 M |
| 4,665,590 A | * | 5/1987 | Udelhofen | F16G 11/101 24/115 H |
| 4,788,755 A | * | 12/1988 | Kasai | A45C 13/30 24/136 A |
| 4,807,333 A | * | 2/1989 | Boden | A43C 7/08 24/136 R |
| 4,919,370 A | * | 4/1990 | Martin | F16L 5/00 174/153 G |
| 5,435,044 A | * | 7/1995 | Ida | F16G 11/106 24/136 R |
| 5,572,770 A | * | 11/1996 | Boden | F16G 11/101 24/136 R |
| 6,185,798 B1 | * | 2/2001 | Ton | A43C 7/08 24/115 G |
| 6,381,816 B1 | * | 5/2002 | Lai | A43C 7/00 24/130 |
| 6,401,309 B1 | * | 6/2002 | Yang | F16G 11/046 24/115 H |
| 2007/0169380 A1 | * | 7/2007 | Borsoi | A43C 7/08 36/114 |
| 2011/0067211 A1 | * | 3/2011 | Huber | A43B 5/0401 24/712.1 |
| 2012/0073087 A1 | * | 3/2012 | Briganti | F16G 11/106 24/122.6 |
| 2013/0232817 A1 | | 9/2013 | Seliger | |
| 2013/0276330 A1 | | 10/2013 | Dinndort et al. | |
| 2018/0153262 A1 | * | 6/2018 | Shimizu | F16G 11/101 |
| 2018/0255878 A1 | * | 9/2018 | Harris | A43C 1/02 |
| 2019/0032752 A1 | * | 1/2019 | Romero | A44B 11/10 |
| 2019/0078646 A1 | * | 3/2019 | Shimizu | F16G 11/106 |
| 2019/0208866 A1 | * | 7/2019 | Dietrich | A44B 11/04 |

FOREIGN PATENT DOCUMENTS

| | | |
|---|---|---|
| EP | 2620071 A1 | 7/2013 |
| JP | 2006075179 A | 3/2006 |
| JP | 2007215845 A | 8/2007 |

OTHER PUBLICATIONS

Written Opinion, PCT/EP2017/058304, dated Jul. 11, 2017, 7 pages.

\* cited by examiner

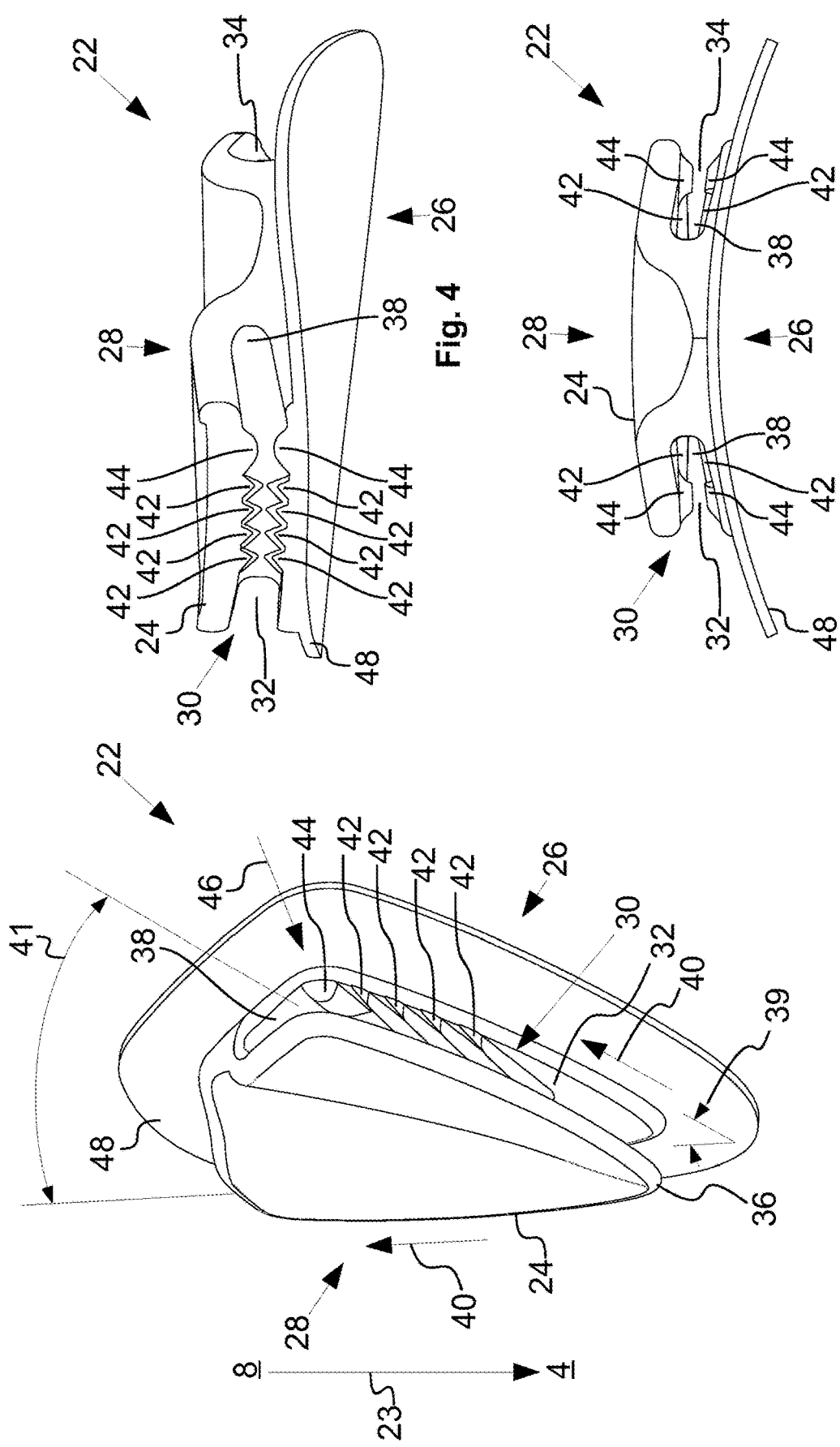

SHOELACE FASTENING FOR INNER SHOE

REFERENCE TO RELATED APPLICATIONS

This application is a US national stage application based on PCT/EP2017/058304 filed Apr. 6, 2017, and claims priority to DE 10 2016 106 958.2 filed Apr. 14, 2016, the entire disclosures of which are expressly incorporated herein by reference.

FIELD OF THE INVENTION

The present invention relates to a fastening element for a shoe and a winter boot with the fastening element.

BACKGROUND

A fastening element pursuant to the preamble of the valid claim 1 is known from EP 0 848 917 B2. According to claim 1 of this document, the grooves in this fastening element comprise a sliding section which is connected angularly to a clamping section. The grooves in this fastening element are designed to hold the shoelace against a guide direction running away from one another.

One shoelace is first pulled upwards with both hands while being guided in the sliding section to lace the shoe. The ends of the shoelace are then secured in the clamping section by turning them, for which both hands are required. This, however, is unsuitable when being used in the inner shoe, because particularly during quick retying, for example on a snowboard, there is not enough space inside the outer shoe to pull the lace apart with both hands.

SUMMARY OF THE INVENTION

The invention therefore has the task of providing a fastening element pursuant to the preamble of the valid claim 1 which makes it possible to tighten the shoelace with one hand. This task is fulfilled by the characteristics of claim 1. Preferred embodiments of the invention are the subject matter of the dependent claims.

The invention is based on the idea that if the clamping section in the sliding section is turned, the shoelace can be secured with one hand only by pulling the two ends of the shoelace arranged in the grooves. Additional turning of the ends of the shoelace is not necessary. This is why a shoelace can easily be retightened with one hand at any time, even if the person wearing the shoe or boot is standing on a snowboard, a roller skate or similar.

The described fastening element can be used both with an outer shoe and an inner shoe, wherein using it in an inner shoe is particularly effective due to the lack of space in the inner shoe.

The fastening element pursuant to claim 2 is able to easily increase the friction on the shoelace and hold it in such a manner.

The fastening element pursuant to claim 3 is designed to pull the shoelace into the grooves when being held. In this way, it can be avoided that the shoelace becomes accidentally undone and slips out of the grooves.

The fastening element pursuant to claim 4 is designed to wedge the teeth in the shoelace when the latter moves against the guide direction. In this way, the retaining effect of the said fastening element is increased.

The different sizes pursuant to claim 5 are designed to adjust the individual teeth to different mechanical requirements in the grooves.

The fastening element pursuant to claim 6 prevents the shoelace from accidentally slipping out of the grooves.

The arrangement of the bigger teeth at the start provides the greatest leverage when the shoelace is pressed into the groove. The fastening element pursuant to claim 8 can be fastened particularly easily on an inner shoe by means of the flange.

The fastening element described above can be installed in an inner shoe of a winter boot pursuant to claim 6.

BRIEF DESCRIPTION OF THE FIGURES

The above-described properties, features and advantages of this invention, as well as the manner in which they are achieved, will become clearer in connection with the following description of the embodiments, which are described in more detail in connection with the drawings, in which:

FIG. 3 is the fastening element of FIG. 2 in a first perspective view, FIG. 4 is the fastening element of FIG. 2 in a second perspective view, and FIG. 5 is the fastening element of FIG. 2 when viewed from below.

Figure 2:
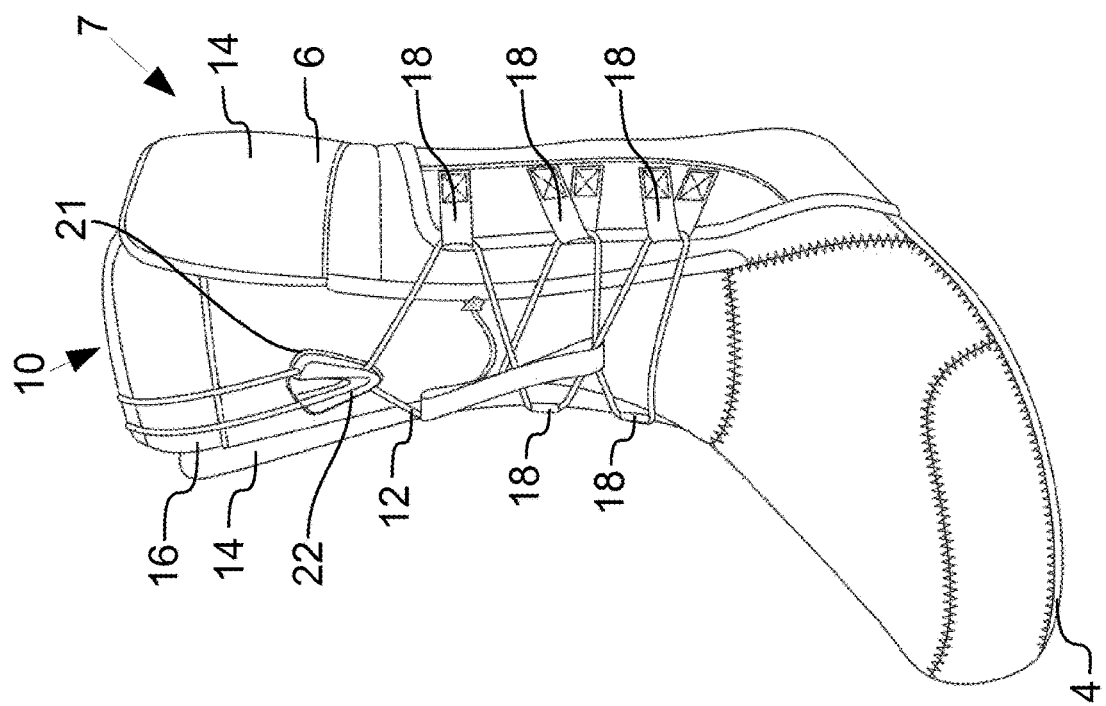
FIG. 2 is a perspective view of an inner shoe of a winter boot with a fastening element.

In the drawings, the same technical elements are provided with the same reference signs, and are only described once. The drawings are purely schematic, and, in particular, do not reflect the actual geometric proportions.

DETAILED DESCRIPTION OF PREFERRED EMBODIMENTS

Figure 1:
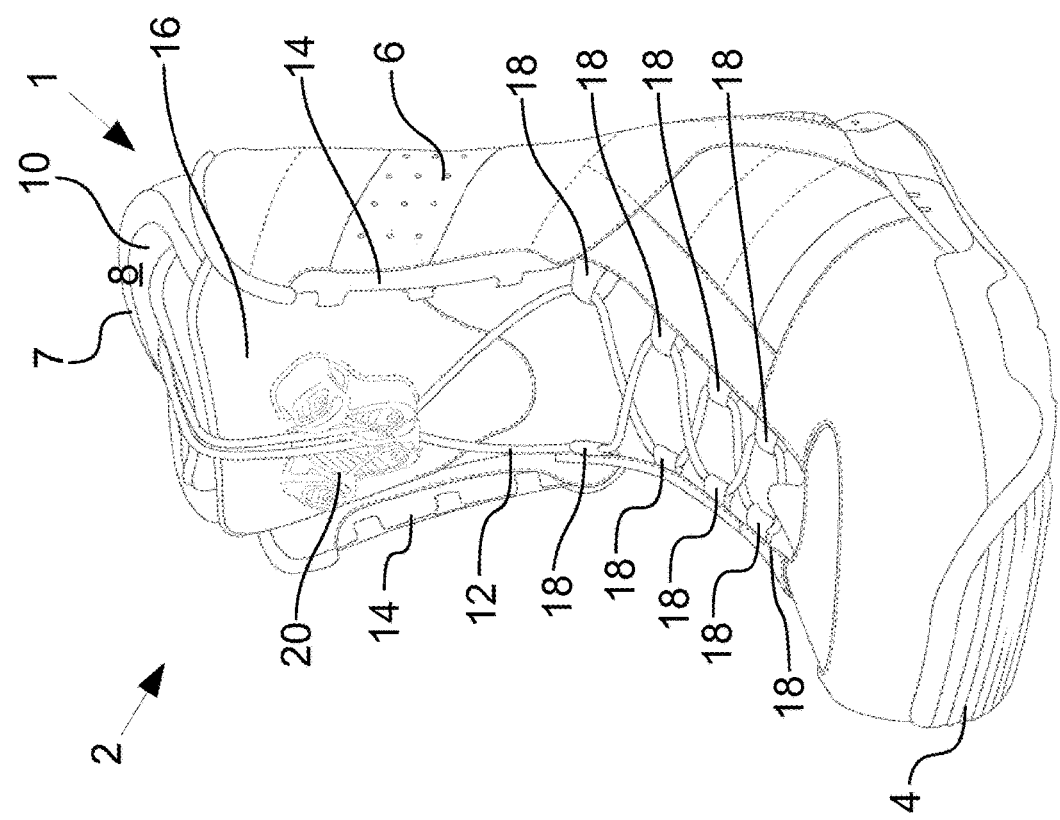
FIG. 1 is a perspective view of an outer shoe of a winter boot.

Reference is made to FIG. 1 showing a perspective view of an outer shoe 1 of a winter boot 2.

The outer shoe 1 comprises a boot sole 4 and a shaft 6, enclosing an inner shoe 7 still to be described. This inner shoe 7 comprises a foot room 8, in which a foot (not shown in further detail) can be inserted via an opening 10.

The foot inserted into the foot room 8 can now be fixed on the outer shoe 1 via one or several lacing zones (not provided with reference signs) in the foot room 8. The outer shoe 1 shown in FIG. 1 has two lacing zones, with one shoelace 12 running through one lacing zone only.

Two side sections 14 on the shaft 6 can be laced via the lacing zones which are covered by a tongue 16. Loops 18, still to be described in detail, to guide the shoelace 12 are fastened on the side sections 14. In the present embodiment, the shoelace 12 runs crosswise through the loops 18.

The tightened shoelace 12 can be clamped to a clamping element 20 after lacing. As this clamping element 20 is of no importance here, we do not give more details.

Reference is made to FIG. 2 showing a perspective view of the inner shoe 7.

The inner shoe has the same essential technical elements as the outer shoe 1. It has, however, only one lacing zone and thus only one shoelace 12. Sole 4 and shaft 6 of the inner shoe 7 enclose the foot room 8 closely. For the sake of brevity, we shall dispense here with a detailed description of the individual technical elements of the inner shoe 7.

Unlike the outer shoe 1, instead of the clamping element, the inner shoe 7 has a fastening element 22 to be described in detail in the following FIGS. 3 to 5. The fastening element 22 may be attached to the inner shoe 7 with any fastening element, such as a seam 21 in this example. FIG. 3 shows the fastening element in an installation direction 23 on the winter boot 2, extending from the opening 8 to the boot sole 4.

The fastening element 22 has a disk-shaped main part 24 comprising a base side 26, a cover side 28 lying opposite the base side 26, and a casing side 30 running between the base side 26 and the cover side 28. The individual sides 26 to 30 must not be flat and, as shown in the figures, may also be sharply tapered at some points, such as the casing side 30 in an area facing the opening 8.

The casing side 30 comprises a first casing side section 32 and a second casing side section 34 which approach each other towards the boot sole 4, and meet in a tip 36. It is not necessarily required, however, that the sides meet in the tip 36. The two casing side sections 32, 34 do not extend over the entire casing side 30, so that the present embodiment comprises at least one more casing side section without its own reference sign.

A groove 38 extends into the main part 24 on each of the first and the second casing side section 32, 34 to receive the shoelace 12 of the inner shoe 7. These grooves 38 are designed to hold the shoelace 12 (not shown in FIGS. 3 to 5) against a guide direction 40, thus preventing any movement of the shoelace against this guide direction 40. The ends of the shoelace 12 enter the grooves 38 at the tip 36 of the fastening element 22 with an entrance angle 39, and, opposite the tip 36, exit the grooves 38 with an exit angle 41. The entrance angle 39 is equal to or greater than the exit angle 41, so that, contrary to EP 0 848 917 B2, both ends of the shoelace 12 are brought together to be held with one hand for lacing contrary.

For this purpose, teeth 42, 44 are arranged in the individual grooves 38 which extend into an inside of the grooves 38 which, for the sake of clarity, is not provided with reference signs. The teeth 42, 44 are aligned parallel to each other, and run at an angle in the respective grooves 38 in a tooth direction 46, in particular at an obtuse angle to the guide direction 40. There are two different types of teeth 42, 44. The first teeth 42 are smaller than the second teeth 44, and are arranged after the second teeth 44 in the guide direction 40. Furthermore, the second teeth 44 run in the tooth direction 46 not over the entire groove 38, but only on its outside when viewed in the tooth direction 46.

As shown in FIG. 2, the shoelace 12 is inserted crosswise in the grooves 38 of the casing side sections 32, 34. In this way, the tip 36 provides a point of leverage, and the ends of the shoelace 12 can be pressed onto it through the narrow between the two bigger second teeth 44 by pulling them. The shoelace 12 can then be tightened by pulling it in the guide direction 40. To enable this pulling, the first teeth 42 are pointed and arranged in the guide direction 40.

To prevent the shoelaces 12 slipping out of the grooves 38 during pulling due to the first teeth 42 running in the guide direction 40, the bigger second teeth 44 serve as limitation. Once the shoelaces 12 are tightened, and, for example, are loaded on tension in the guide direction 40 due to a movement of the person wearing the winter boot 2, the shoelaces 12 are drawn into the inside of the grooves 38 in the guide direction 46 due to the arrangement of the first teeth 42. For this reason, the bigger second teeth 44 are also interrupted in the inside of the grooves. The tightness of the lacing of the shoelaces 12 on the fastening element 22 can be adjusted at any time by pulling the shoelaces 12 in the guide direction 40. This can be done with only one hand at any time.

To attach the fastening element 22 easily to the inner shoe 7, it is equipped with a flange element 48. By means of this flange element 48, the fastening element 22 can be fastened to the inner shoe 7 by sewing, gluing, riveting, screwing or in any other manner.

Instead of the clamping element 20, the fastening element 22 may also be used on the outer shoe 1 to fasten the shoelace 12.

Figure 7:
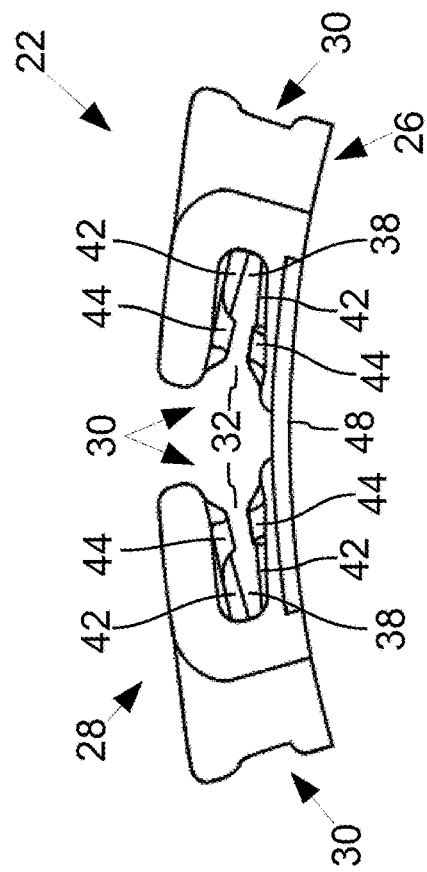
FIG. 7 is the fastening element of FIG. 6 when viewed from below.
Figure 6:
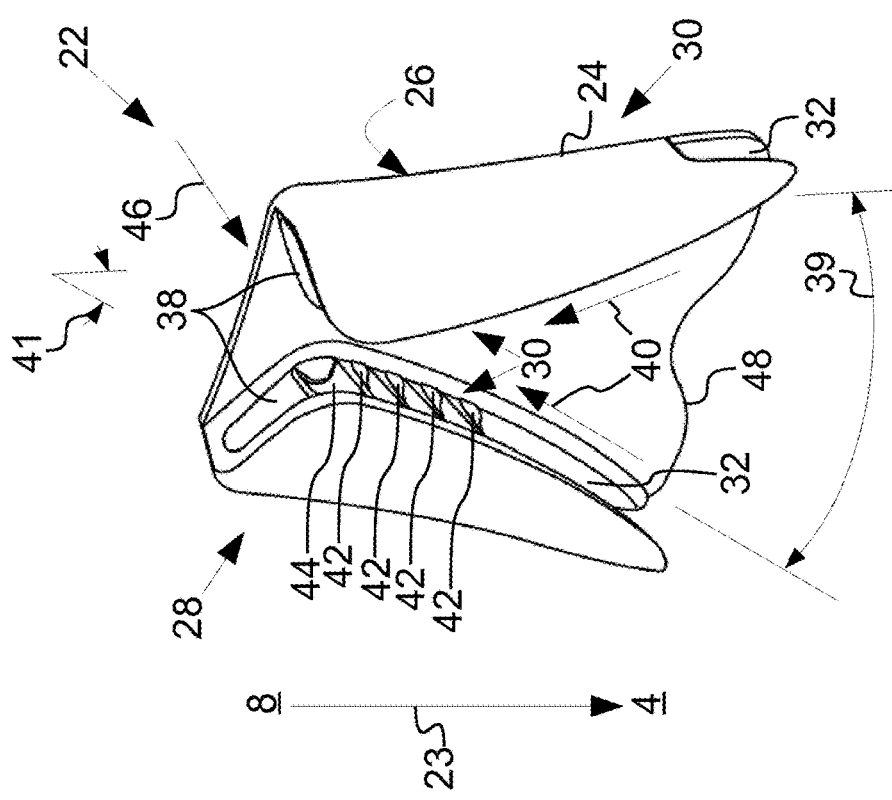
FIG. 6 is an alternative fastening element in a perspective view.

FIGS. 6 and 7 show an alternative embodiment of the fastening element comprising a multi-section main part 24. In this case, the ends of the shoelace 12 are not guided crosswise, but run at a distance from each other in the respective grooves 38.

The invention claimed is:

1. Fastening element for a shoe of a boot comprising a single or multi-part main part, comprising
    a base side for fastening to the shoe,
    a cover side lying opposite the base side and
    two grooves which are moulded into a casing between the base side and the cover side for receiving and guiding a respective end of a shoelace, wherein the ends of the shoelace, guided in the grooves, can be pulled in a guide direction of the respective groove to lace the boot,
    wherein the grooves are spaced apart and angled relative to each other for defining an entrance angle at which shoelaces are to enter into the fastening element when laced in the guide direction and an exit angle at which shoelaces are to exit the fastening element when pulled in the guide direction, and wherein the entrance angle is greater than or equal to the exit angle,
    wherein the grooves comprise a plurality of first teeth, which extend into the inside of the respective groove from opposite sides thereof in a tooth direction and are aligned parallel to each other, wherein the tooth direction is at an obtuse angle relative to the guide direction of the respective groove,
    wherein the first teeth each have a surface tilted in the guide direction to enable pulling shoelaces within the grooves in the guide direction and prevent the shoelaces from moving against the guide direction,
    wherein the grooves comprise one or more second teeth, which extend into the inside of the respective groove from at least one of the sides thereof in the tooth direction, and
    wherein the second teeth are larger than the first teeth and located nearer an outer edge of the sides of the respective groove than the first teeth to prevent shoelaces from slipping out of the grooves and to retain the shoelaces in the fastening element.

2. Fastening element as claimed in claim 1, wherein each of the second teeth extends over a part of the inside of the respective groove on the outside.

3. Fastening element as claimed in claim 1, wherein each of the second teeth is arranged after the smaller first teeth in one of the grooves when viewed in the corresponding guide direction.

4. Fastening element as claimed in claim 1, wherein the main part comprises a flange element for fastening on the shoe.

5. Fastening element as claimed in claim 1, wherein the entrance angle is greater than the exit angle such that said entrance angle is configured to spread laces entering the fastening element and the exit angle is configured to bring laces together upon exiting the fastening element.

* * * * *